United States Patent [19]

Tsuchihashi et al.

[11] Patent Number: 4,956,790
[45] Date of Patent: Sep. 11, 1990

[54] INSTRUCTION SYSTEM OF REMOTE-CONTROL ROBOT

[75] Inventors: Toshio Tsuchihashi; Yasushi Wakahara, both of Yokohama; Kuniji Asano, Tokyo, all of Japan

[73] Assignee: Kabushiki Kaisha Toshiba, Kawasaki, Japan

[21] Appl. No.: 151,908

[22] Filed: Feb. 3, 1988

[30] Foreign Application Priority Data

Feb. 6, 1987 [JP] Japan ................... 62-24882

[51] Int. Cl.$^5$ ............................................ G05B 19/00
[52] U.S. Cl. ..................................... 364/513; 364/188; 414/5; 901/3; 901/34; 901/49
[58] Field of Search ........................................ 901/3–5, 901/34, 49; 364/149–151, 177, 188, 190, 513; 414/5; 434/45

[56] References Cited

U.S. PATENT DOCUMENTS

| 4,504,233 | 3/1985 | Galus et al. ................ 434/45 |
| 4,510,574 | 4/1985 | Guittet et al. .............. 364/513 |
| 4,568,286 | 2/1986 | Acklam ..................... 434/45 |

FOREIGN PATENT DOCUMENTS 0125776  11/1984  European Pat. Off. .

OTHER PUBLICATIONS

"Bilateral Control for Manipulators with Different Configurations", Tatsuo Arai et al., IECON 1984.
Wakahara et al., "A Computer Aided Manipulation System for a Multijoint Inspection Robot," Proceedings, 32nd Conference on Remote Systems Technology, 1984, vol. 2, pp. 33–38.
Tsuchihashi et al., "A Computer Aided Manipulation System for Multijoint Inspection Robot," 1985 International Conference on Advanced Robotis (ICAR), pp. 363–369.
S. Kawabe et al., Computer Aided Technologies, "Robot Task Planning System Based on Product Modeling", pp. 471–476, Sep. 9–13, 1985.
B. Espiau, Revue Generale de L'Electricite, "La perception en teleoperation", vol. 11, pp. 708–710, 713, 714, Nov. 1984.
S. Lee et al., 1985 IEEE Int'l. Conference on Robotics and Automation, "Computer Control of Space-Borne Teleoperators with Sensory Feedback", pp. 205–214, Mar. 25–28, 1985.

Primary Examiner—Allen MacDonald
Attorney, Agent, or Firm—Foley & Lardner, Schwartz, Jeffery, Schwaab, Mack, Blumenthal & Evans

[57] ABSTRACT

An instruction system of a remote-control robot having a work manipulator. The system comprises an instruction manipulator for providing work instructions to the work manipulator; a solid geometrical model forming device for forming solid geometrical models of the work manipulator and work circumstances; a simulating device for operating the positions and attitude of the geometrical models according the information of motions of the instruction manipulator and information from various sensors of the work manipulator to simulate geometrical models, as well as driving the work manipulator according to the information from the instruction manipulator, etc.; and a graphic display for displaying motions of the geometrical models. The solid geometrical model forming device forms geometrical models of the work manipulator and work circumstances, the simulating device simulating actual working positions of the geometrical models, and the graphic display displaying the simulated geometrical models. After that, the work manipulator is driven according to the instruction information. Thus, an operator can give work instructions to the work manipulator through the instruction manipulator while monitoring, at a real time, motions of the geometrical models displayed on the graphic display.

11 Claims, 6 Drawing Sheets

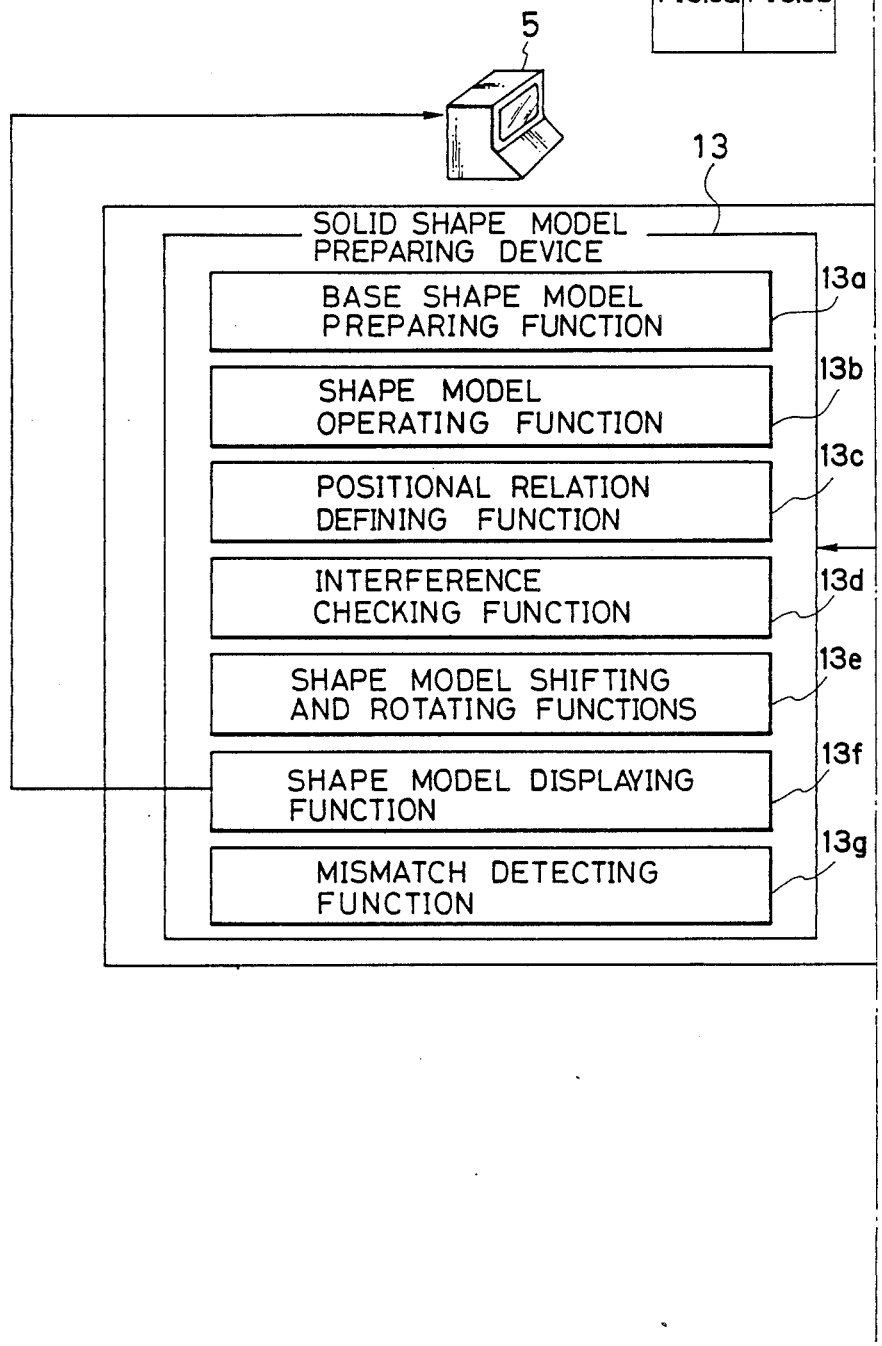

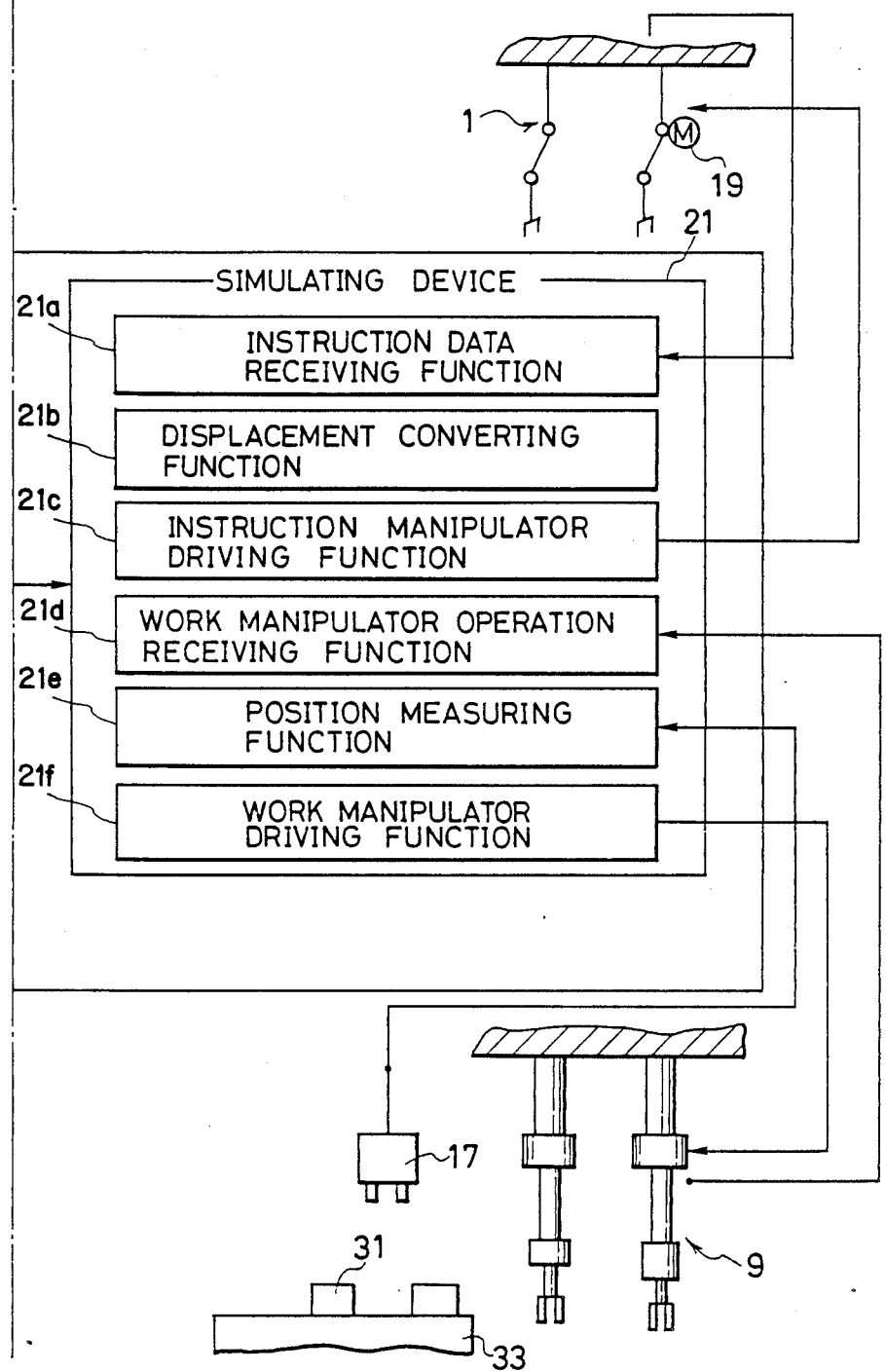

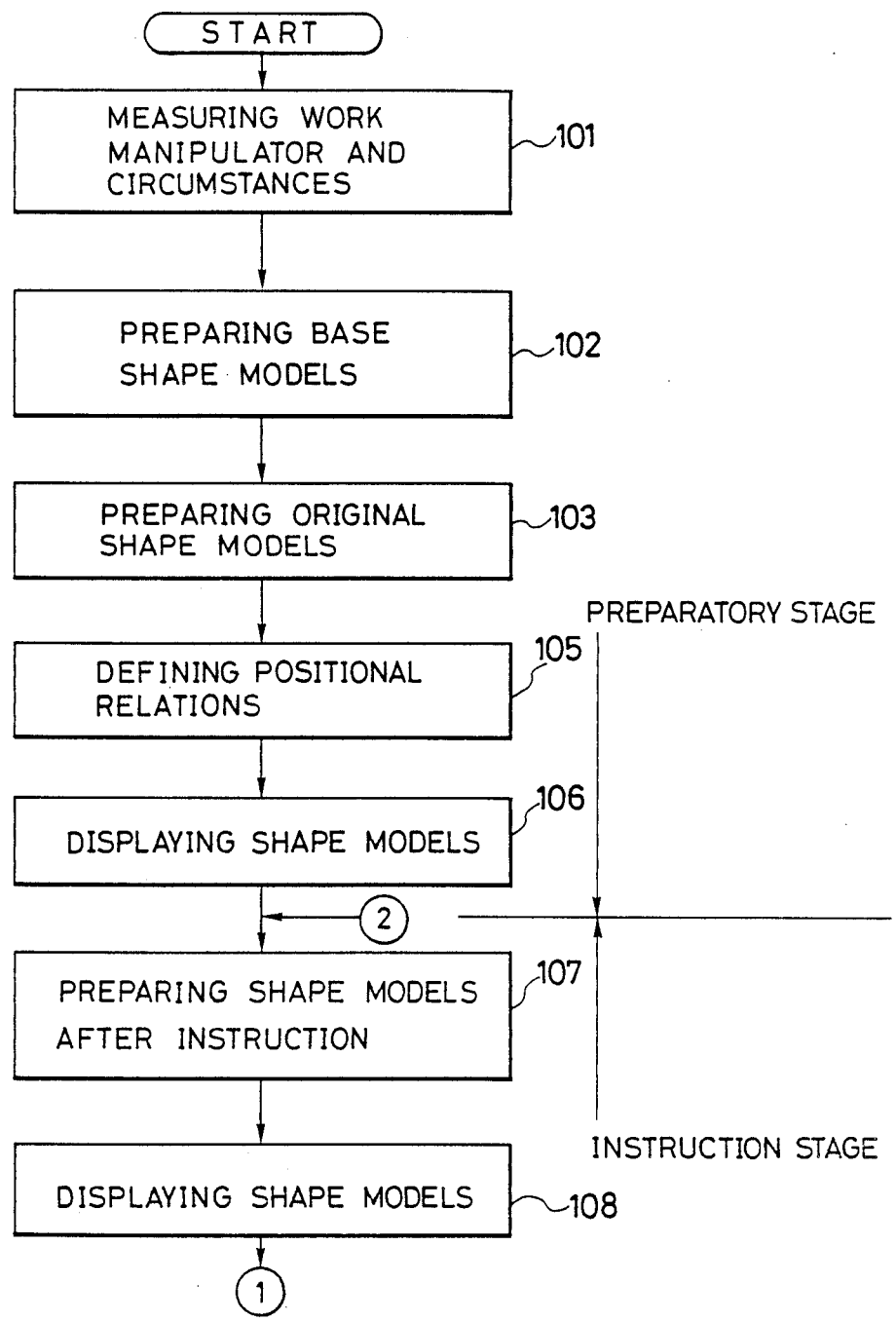

INSTRUCTION SYSTEM OF REMOTE-CONTROL ROBOT

BACKGROUND OF THE INVENTION

1. Field of the Invention

The present invention relates to an instruction system for a remote-control robot which works unmanned at a remote place such as space far from the earth, and particularly to an instruction system which enables an operator on the earth to operate a remote-control robot in space while monitoring on the earth the work of the robot substantially on a real time basis.

2. Description of the Prior Art

Currently, there is a necessity to provide a remote-control robot which can work unmanned in special work circumstances such as space.

To realize such a remote-control robot, it is proposed to use a conventional instruction system such as master/slave (M/S) method shown in FIG. 1. In this figure, a picture of a work manipulator 101 in space is taken by a stereo camera 103. Images from the stereo camera 103 are displayed on a display 105. While monitoring the images on the display 105, an operator operates an instruction manipulator 107 to drive the work manipulator 101 via a servo controller 109.

However, unlike controlling the robot at a proximal position on the earth, there is a dead time due to a communication delay between space and the earth. Therefore, a delay of one second or more is caused after the instruction manipulator 107 is operated to move the work manipulator 101 until motions of the work manipulator 101 are displayed on the display 105 on the earth. Therefore, the operator is forced to give instructions to the work manipulator 101 according to motions thereof which are based on instructions given one second before or more by the operator through the instruction manipulator 107. Namely, the operator cannot catch motions of the work manipulator 101 on a real time basis. This may be very dangerous.

In executing unmanned works in special work circumstances such as space as shown in FIG. 1, the conventional instruction system of the M/S method is hard to realize as a stable operation because of communication delays between space and the earth.

SUMMARY OF THE INVENTION

An object of the present invention is to provide an instruction system for a remote-control robot, which can eliminate the above-mentioned problems in remotely operating the robot.

Another object of the present invention is to provide an instruction system for a remote-control robot working in space, which enables an operator to give instructions to the robot while confirming, on the earth, the work of the robot in space substantially at a real time.

In order to accomplish the objects, the present invention provides an instruction system for remote-control robot, which comprises an instruction manipulator for providing work instructions to the remote-control robot having a work manipulator; a solid geometrical model forming device for forming solid geometrical models of the work manipulator and work circumstances; a simulating device for operating the positions and constitution of the geometrical models according the information of motions of the instruction manipulator and information from various sensors of the work manipulator to simulate geometrical models, as well as driving the work manipulator according to the information from the instruction manipulator, etc.; and a graphic display for displaying motions of the geometrical models.

The solid geometrical model forming device prepares geometrical models of the work manipulator and work circumstances, the simulating device simulating actual working positions of the geometrical models, and the graphic display displaying the simulated geometrical models. After that, the work manipulator is driven according to the instruction information. Thus, an operator can give work instructions to the work manipulator through the instruction manipulator while monitoring, on a real time basis, motions of the geometrical models displayed on the graphic display.

BRIEF DESCRIPTION OF THE DRAWINGS

These and other objects, features and advantages of the present invention will become apparent from the following description of a preferred embodiment taken in conjunction with the accompanying drawings in which:

Figs. 3a and 3b are a block diagram showing respective functions of a solid geometrical model forming device and a simulating device incorporated in a computer of the embodiment shown in FIG. 2; and FIGS. 4a and 4b are flow charts showing operation sequences of the embodiment shown in FIG. 2.

DETAILED DESCRIPTION OF THE PREFERRED EMBODIMENTS

Figure 1:
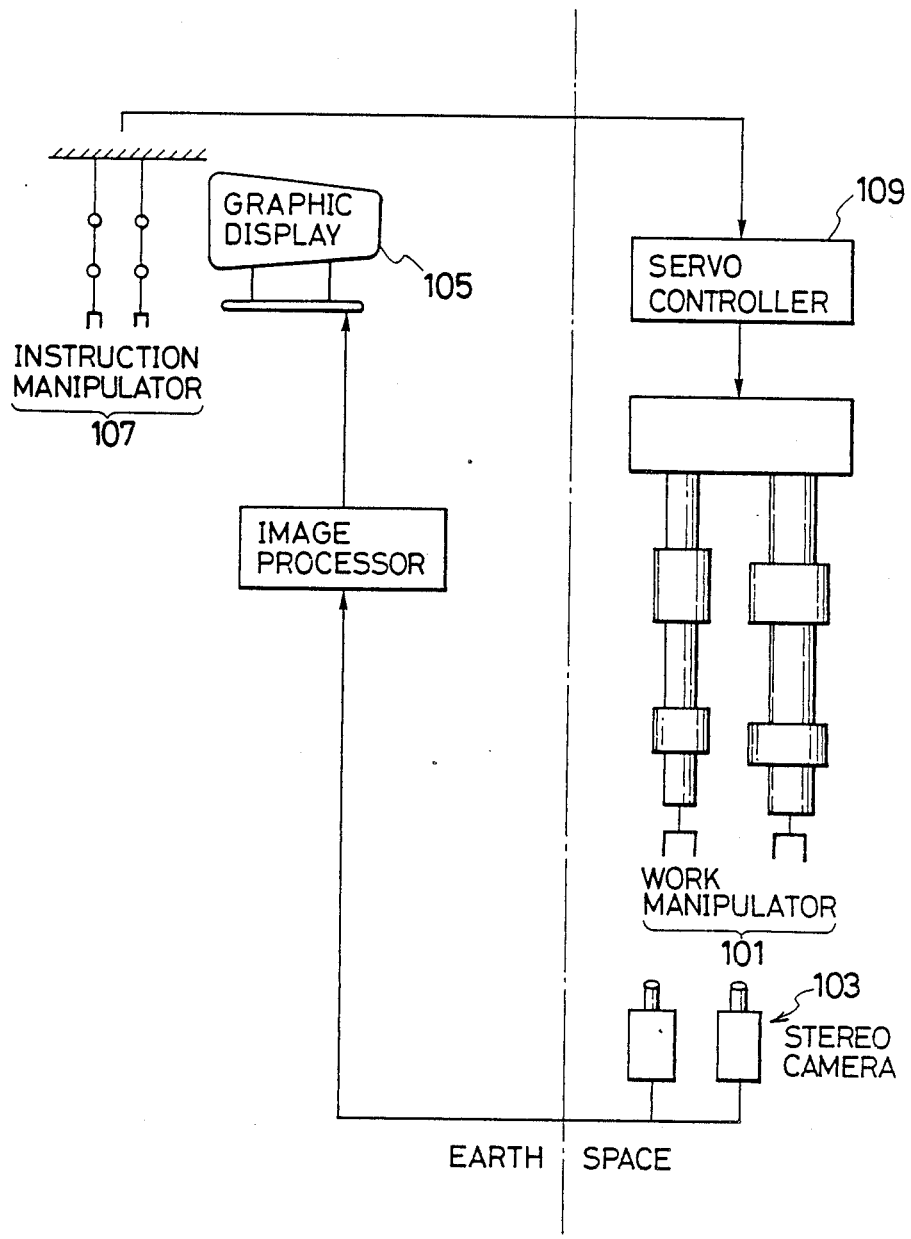
FIG. 1 is a block diagram showing an instruction system of a remote-control robot according to a conventional M/S method.
Figure 2:
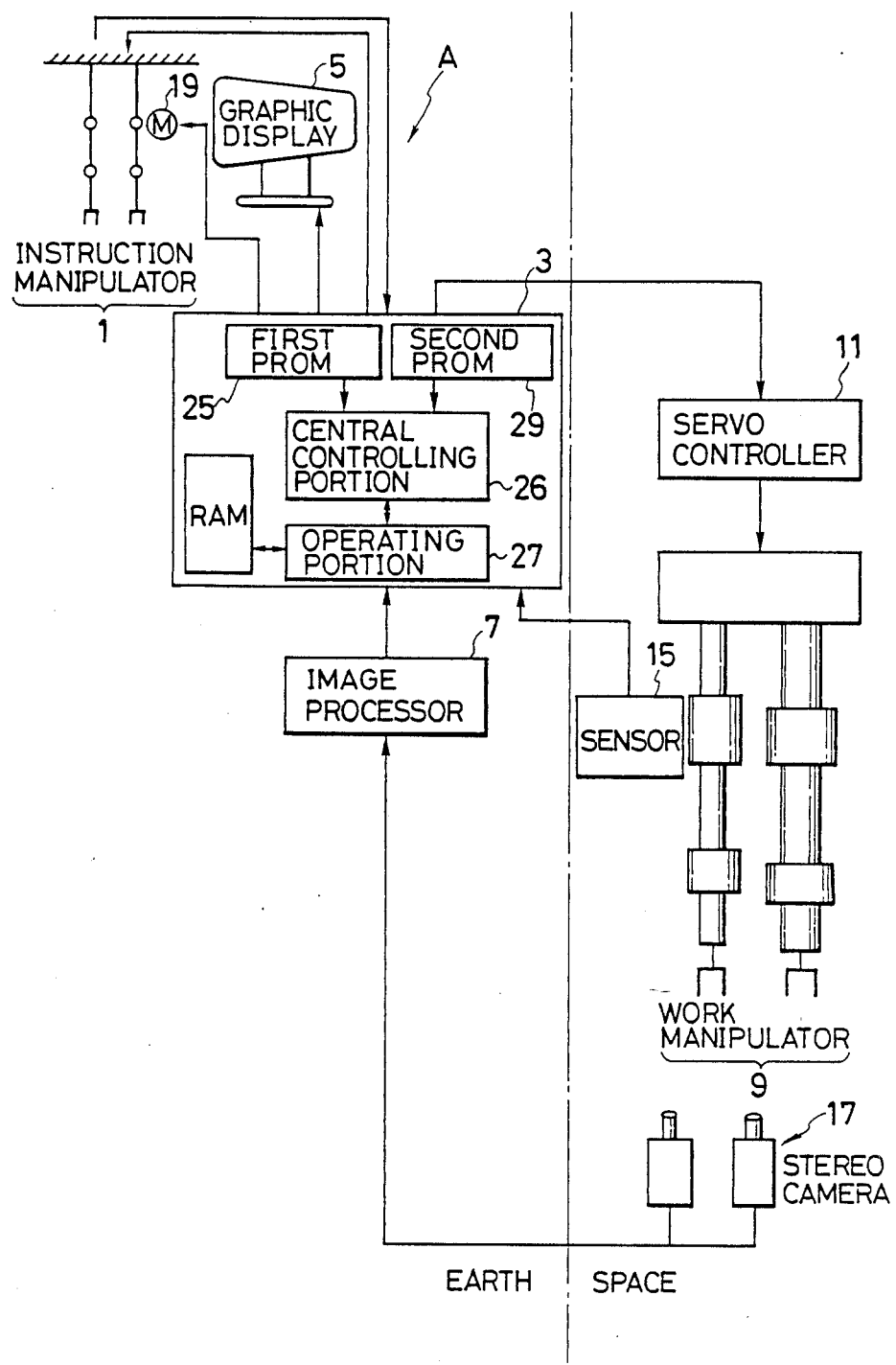
FIG. 2 is a block diagram showing an instruction system of a remote-control robot according to an embodiment of the present invention.

FIG. 2 is a block diagram showing a instruction system of a remote-control robot according to an embodiment of the present invention.

An instruction system "A" is located on the earth to operate a work manipulator 9 disposed in work circumstances in space. The instruction system A comprises an instruction manipulator 1 used by an operator to input instructions; an image processor 7 for processing video signals from a stereo camera 17 which takes pictures of the work manipulator 9 and its work circumstances; a computer 3 for supplying operation signals according to instruction data from the instruction manipulator 1 to a servo controller 11 to operate the work manipulator 9 and forming geometrical models of the work manipulator 9 and work circumstances according to the video signals from the image processor 7, detection signals from a sensor 15 fitted to the work manipulator 9 and the instruction signals from the instruction manipulator 1; and a graphic display 5 for displaying the geometrical models formed by the computer 3.

The instruction manipulator 1 is provided with a motor 19 for generating reaction against force applied by the operator onto the instruction manipulator 1. If the formed geometrical models of the work manipulator and work circumstances interfere with each other, the computer 3 sends drive signals to the motor 19 to generate the reaction.

As shown in FIG. 3, the work circumstances include related apparatuses such as the stereo camera 17, a work object 31 and an obstacle 33.

Two arms are provided for the instruction manipulator 1 to give instructions to the work manipulator 9 having two arms. Motions of the arms are successively inputted to the computer 3.

The computer 3 which is an essential part of the present invention will be described.

As shown in FIG. 3, the computer 3 comprises a solid geometrical model forming device 13 and a simulating device 21. The solid geometrical model forming device 13 has a primitive geometrical model forming function 13a for forming geometrical models of the work manipulator and work circumstances according to video signals from the image processor 7; a geometrical model operating function 13b for operating and forming geometrical models indicating the working conditions of the geometrical model of the work manipulator 9; a positional relation defining function 13c for defining positional relations of the geometrical models of the work manipulator and work circumstances; an interference checking function 13d for judging according to the defined positional relations of the geometrical models whether or not the geometrical models interfere with each other; geometrical model shifting and rotating functions 13e for shifting and rotating the geometrical models; a displaying function 13f for displaying the geometrical models on the graphic display 5; and a mismatch detecting function 13g for detecting whether or not any mismatch exists between the actual work manipulator and work circumstances and the geometrical models thereof after the completion of work.

The simulating device 21 has an instruction data receiving function 21a for receiving instruction data inputted from the instruction manipulator 1; a displacement converting function 21b for converting the inputted instruction data into displacement data of the geometrical models; an instruction manipulator driving function 21c for driving the motor 19 to generate reaction against force applied by the operator onto the instruction manipulator 1 when the geometrical models interfere with each other; a work manipulator operation receiving function 21d for receiving operating conditions of the work manipulator 9 transmitted from the sensor 15; a position measuring function 21e for receiving video signals from the stereo camera 17 via the image processor 7; and a work manipulator driving function 21f for driving the work manipulator 9 according to the instruction data.

As shown in FIG. 2, the solid geometrical model forming device 13 comprises a first PROM 25 storing a first program, a central controlling portion 26 and an operating portion 27, while the simulating device 21 comprises a second PROM 29 storing a second program, the central controlling portion 26 and the operating portion 27.

The functions of the solid geometrical model forming device 13 described in the above are realized by the operating portion 27 under the control of the central controlling portion 26 according to the first program stored in the first PROM 25, while the functions of the simulating and operating device 21 described in the above are realized by the operating portion 27 under the control of the central controlling portion 26 according to the second program stored in the second PROM 29.

The computer 3 further comprises a RAM for executing operations of the operating portion 27.

Although the first and second programs are processed by the sole operating portion 27 in this embodiment, they may be processed by separate two operating portions. Further, the solid geometrical model forming device 13 and the simulating device 21 may be constituted by two separate computers which are able to execute the functions of the devices 13 and 21, respectively.

Figure 4B:
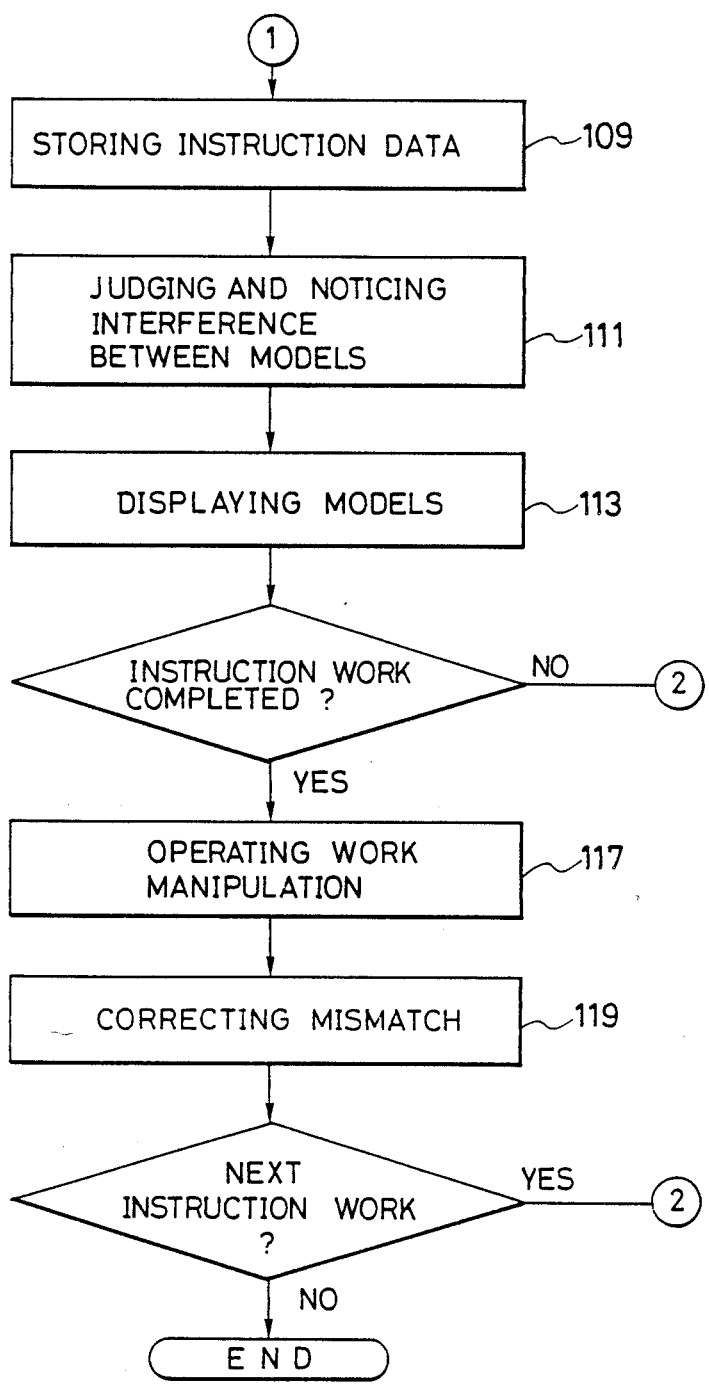

The sequences of instructing the work manipulator 9 by the instruction system of the present invention will be described with reference to FIG. 4.

In step 101, the position measuring function is executed according to the second program to measure conditions of the work manipulator 9 and work circumstances by using the stereo camera 17.

In step 102, the base geometrical model forming function is executed by the solid geometrical model forming device 13 according to the first program stored in the first PROM 25 to prepare base shapes (circular cylinders, rectangles, etc.,) of the work manipulator 9 and work circumstances by using a three-dimensional geometrical modeller according to the measurement of the step 101.

In step 103, the geometrical model operating function is executed to operate (add or subtract) the base geometrical models to prepare original geometrical models of the work manipulator and work circumstances.

In step 105, the positional relation defining function is executed to define positional relations of the original geometrical models of the work manipulator and work circumstances.

In step 106, the geometrical model displaying function is executed according to the first program to display the original geometrical models on the graphic display 5. A preparatory stage will be accomplished with the steps 101 to 106.

Then, an instruction stage will be started. The operator monitors the original geometrical models on the graphic display 5 and manipulates the instruction manipulator 1 to give necessary instructions.

In step 107, the instruction data receiving function is executed according to the second program stored in the second PROM 29 to periodically input the motions of the instruction manipulator 1 via an angle detector 7 and receive them as instruction data. The displacement converting function is then executed to convert the instruction data into displacement quantities of the original geometrical models of the work manipulator and work circumstances. After that, the geometrical model shifting and rotating functions are executed according to the first program to prepare geometrical models based on the motions of the instruction manipulator 1.

In step 108, the geometrical model displaying function is executed according to the first program to display the motions of the geometrical models corresponding to the motions of the instruction manipulator 1 on the display 5. At the same time, the displacement quantities mentioned in the above are stored as instruction data (step 109).

In step 111, the interference checking function is executed according to the first program to judge whether or not the geometrical models of the work manipulator and work circumstances interfere with each other. If there is interference, the instruction manipulator driving function is executed according to the second program to drive the motor 19 to cause reaction on the instruction manipulator 1 to inform the operator of the occurrence of interference.

In step 113, the geometrical model displaying function is executed according to the first program to again display the solid geometrical models of the work manipulator and work circumstances on the graphic display 5.

In step 115, if the operator's instruction work is not completed, it proceeds to step 107, and, if the instruction work is completed, it proceeds to step 117.

In the step 117, the work manipulator driving function is executed according to the second program to send the instruction data stored previously to the work manipulator 9 via the servo controller 11 to drive the work manipulator 9.

In step 119, the work manipulator operation receiving function and the position measuring function are executed according to the second program to measure, by using the stereo camera 17 and the sensor 15, actual conditions of the work manipulator 9 and work circumstances after they have been manipulated according to the instruction data. Then, the mismatch detecting function is executed according to the first program to detect whether or not there is any mismatch between the solid geometrical models and the actual conditions of the work manipulator and work circumstances after they have been manipulated. If there is a mismatch, the geometrical model shifting and rotating function is executed according to the first program to correct the solid geometrical models such that the geometrical models will match with the actual conditions of he work manipulator and work circumstances.

In step 121, if the next instruction work is required, it proceeds to the step 107, and, if not, the instruction work is terminated.

In summary, according to the instruction system of the present invention, a work manipulator and its work circumstances in space are related to geometrical models thereof on a graphic display on the earth, and motions of an instruction manipulator are displayed on the display at a real time. As a result, an operator may not sense delays in handling the work manipulator to easily carry out his instruction work.

Therefore, the operator can give instructions to a robot in space as if the robot were located close to him.

Various modifications will become possible for those skilled in the art after receiving the teachings of the present disclosure without departing from the scope thereof.

We claim:

1. An instruction system for remotely controlling a working apparatus disposed in remote work circumstances, comprising:
   (a) an instructing portion for receiving instructions to be given to said working apparatus from an operator and outputting instruction signals, said instruction portion being disposed at a location remote said working apparatus;
   (b) detecting means for detecting said work circumstances of said working apparatus to output detection signals;
   (c) computing means for supplying operating signals according to said instruction signals from said instructing portion to drive said working apparatus, and forming geometrical models of said working apparatus and said work circumstances according to said instruction signals from said instructing portion and said detection signals from said detecting means, said computing means being disposed at a location adjacent to said instruction portion; and
   (d) display means for displaying said geometrical models formed by said computing means, said display means being disposed at a location adjacent to said instruction portion, thereby enabling an operator to input instructions into said instructing portion while monitoring said displayed geometrical models.

2. The instruction system as claimed in claim 1, wherein said computing means and display means are disposed at a location remote from said working apparatus.

3. The instruction system as claimed in claim 1, further comprising:
   a reaction generating means for generating a reaction against force applied by an operator to said instructing portion, when said geometrical models of said working apparatus and said work circumstances interfere with each other, said computing means supplying driving signals to said reaction generating means to generate said reaction.

4. The instruction system as claimed in claim 3, wherein said computing means includes a solid geometrical model forming means for forming said geometrical models and a simulating means,
   said solid geometrical model forming means having a base geometrical model forming function for forming base geometrical models of said work apparatus and work circumstances according to said detection signals from said detecting means; a geometrical model operating function for forming geometrical models indicating the working conditions of said base geometrical mode of said working apparatus; a positional relation defining function for defining positional relations of said geometrical models of said working apparatus and work circumstances; an interference checking function for determining according to said defined positional relations of said geometrical models whether or not said geometrical models interfere with each other; geometrical model shifting and rotating functions for shifting and rotating said geometrical models; a geometrical model displaying function for displaying said geometrical models on said display means; and a mismatch detecting function for detecting whether or not any mismatch exists between said working apparatus and work circumstances and said geometrical models thereof after the completion of movements of said working apparatus according to said instruction signals, and
   said simulating means having an instruction signal receiving function for receiving said instruction signals from said instruction portion; a displacement converting function for converting said inputted instruction signals into displacement data of said geometrical models; an instruction portion driving function for driving said reaction generating means to generate said reaction against force applied by an operator onto said instructing portion when said geometrical models interfere with each other; a working apparatus operation receiving function for receiving operating conditions of said working apparatus; a position measuring function for receiving said detection signals from said detaching means; and a working apparatus driving function for driving said working apparatus according to said instruction signals.

5. The instruction system as claimed in claim 4, wherein said computing means comprises a first PROM storing a first program, a second PROM storing a second program, a central controlling portion and an operating portion, said solid geometrical model forming means being constituted by said first PROM storing said first program, said central controlling portion and said operating portion, the functions of said solid geometrical model forming means being executed by said operating portion under the control of said central controlling portion according to said first program stored in said first PROM, said simulating means being constituted by said second PROM storing said second program, said central controlling portion and said operating portion, the functions of said simulating means being executed by said operating means under the control of said central controlling portion according to said second program stored in said second PROM.

6. The instruction system as claimed in claim 3, wheein said working apparatus comprises a work manipulator, and said instructing portion comprises an instruction manipulator.

7. An instruction method for remotely controlling a working apparatus located in remote work circumstances, comprising the steps of:
(a) forming original geometrical models of said working apparatus and said work circumstances;
(b) displaying said formed original geometrical models;
(c) forming and displaying geometrical models according to instruction signals from an instructing portion to which an operator gives instructions while observing said displayed original geometrical models;
(d) storing said instruction signals from said instructing portion;
(e) driving said working apparatus according to said stored instruction signals after an operator has completely given his instructions; and
(f) detecting whether or not any mismatch exists between said work circumstances and said working apparatus driven in said step (e) and said geometrical models thereof formed in said step (c), and, if there is a mismatch, correcting said mismatch.

8. The instruction system as claimed in claim 7, further comprising the step of:
(g) determining, after said step (d), whether or not said geometrical models formed in said step (c) of said working apparatus and work circumstances interfere with each other, and, if they interfere with each other, generating a reaction against a force applied by an operator onto said instructing portion.

9. An instruction system for a remote-control robot for use in space comprising:
a work manipulator for performing space work;
a solid shape model preparing device for constructing a model of said work manipulator and a model of the environment of said work manipulator;
a stereo camera for forming stereoscopic image signals of said work manipulator and said environment of said work manipulator in space for giving said signals to said model preparing device in order to form models of said work manipulator and said environment thereof as viewed from said camera;
a display for visualizing said models constructed by said model preparing device;
an instruction manipulator through which a desired motion of said work manipulator is formed;
a simulating device connected with said instruction manipulator and said model preparing device for giving to said models formed by said model preparing device the desired motion of said work manipulator and the motion of said environment that would be made by said desired motion of said work manipulator substantially at the same time as said desired motion is being formed by said instruction manipulator;
a memory for storing said desired motion; and
a controller for controlling said work manipulator in accordance with said desired motion.

10. The system of claim 9 wherein said models of said work manipulator and said environment are corrected in accordance with the visual information formed by said stereo camera after completing said motion of said work manipulator.

11. The system of claim 9 further comprising a means for producing a reaction against said motion of said instruction manipulator during the formation of said desired motion when interference between said models of said work manipulator and said environment takes place.

* * * * *